United States Patent
Bolzacchini

(10) Patent No.: US 7,582,006 B2
(45) Date of Patent: Sep. 1, 2009

(54) MACHINE FOR PREPARING ENCASED CURED MEATS

(75) Inventor: Giovanni Bolzacchini, Solarolo Di Goito (IT)

(73) Assignee: Inox Meccanica S.r.l., Solarolo di Goito (IT)

( * ) Notice: Subject to any disclaimer, the term of this patent is extended or adjusted under 35 U.S.C. 154(b) by 0 days.

(21) Appl. No.: 12/155,572

(22) Filed: Jun. 6, 2008

(65) Prior Publication Data
US 2009/0011694 A1 Jan. 8, 2009

(30) Foreign Application Priority Data
Jul. 6, 2007 (IT) .......................... MN2007A0031

(51) Int. Cl.
*A22C 11/00* (2006.01)
(52) U.S. Cl. ....................................................... 452/32
(58) Field of Classification Search ............. 452/21–26, 452/30–35, 37, 46–48, 51
See application file for complete search history.

(56) References Cited

U.S. PATENT DOCUMENTS

| | | | | |
|---|---|---|---|---|
| 3,805,480 A | * | 4/1974 | Cherio et al. .................. 53/64 |
| 4,479,283 A | * | 10/1984 | Hollingsworth ............... 452/22 |
| 4,924,552 A | * | 5/1990 | Sullivan ........................ 452/24 |
| 4,958,477 A | * | 9/1990 | Winkler ..................... 53/138.3 |
| 5,019,012 A | * | 5/1991 | Townsend et al. ............. 452/46 |
| 5,273,481 A | * | 12/1993 | Sullivan ........................ 452/24 |
| 5,887,415 A | * | 3/1999 | Matthews et al. ............. 53/576 |
| 6,066,036 A | * | 5/2000 | Carollo ......................... 452/35 |
| 6,146,261 A | * | 11/2000 | Bienert et al. ................. 452/32 |

FOREIGN PATENT DOCUMENTS

| | | |
|---|---|---|
| DE | 12 17 238 B | 5/1966 |
| EP | 0 068 578 A | 1/1983 |
| EP | 1 078 574 A | 2/2001 |
| EP | 1 484 250 A | 12/2004 |
| EP | 1 777 161 A | 4/2007 |

\* cited by examiner

*Primary Examiner*—Thomas Price
(74) *Attorney, Agent, or Firm*—Modiano & Associati; Albert Josif; Daniel J. O'Byrne

(57) ABSTRACT

A machine for preparing encased cured meats, comprising a first tube for conveying the product to a clipping head, the tube being adapted to be wrapped by a cellulose sheet designed to contain the cured meats and drawn continuously from a reel, and a second tube, which is arranged coaxially and externally to the first tube and is designed to be wrapped by a gauged wrapper and is provided with means for drawing the wrapper so that it is superimposed on the cellulose sheet at a braking device arranged upstream of the clipping head.

3 Claims, 4 Drawing Sheets

MACHINE FOR PREPARING ENCASED CURED MEATS

BACKGROUND OF THE INVENTION

It is known that encased cured meats, such as for example salami and mortadella, currently are prepared industrially by means of machines which provide for the presence of two coaxial tubes.

The first tube, arranged internally, is designed to convey the minced product that arrives from a machine known as stuffing machine, and is surrounded by a tubular casing which is made of several materials and is loaded thereon in a specific quantity in order to gradually unfold, coming into contact with the product.

The second tube, arranged externally, is loaded at the outer surface with a specific quantity of an elastic tubular wrapper constituted by a net or sheath, and such wrapper is drawn by suitable means so as to be superimposed on the casing for containing the product at a braking device which controls the correct feeding of the encased product to a clipping head, which closes the cured meat at the leading and trailing ends.

When the amount of casing and elastic wrapper loaded respectively on the described first and second tubes are depleted, the tubes are removed to be replaced with loaded tubes, and this fact causes downtimes which negatively affect the productivity of the machines.

Cured meats produced with known machines further have characteristics which are not entirely satisfactory as regards rapid seasoning processes, which are currently increasingly practiced in products intended for a certain market bracket, and also as regards the possibility to perform easy peeling in preparation for the slicing that leads to the packaging of cured meats in packs.

SUMMARY OF THE INVENTION

The aim of the present invention is to provide a preparation machine which has, in operation, a drastic reduction of downtimes and allows to obtain cured meats which are particularly suitable for quick seasoning, further allowing particularly easy peeling operations.

This aim is achieved by a machine for preparing encased cured meats, as defined in the appended claims.

BRIEF DESCRIPTION OF THE DRAWINGS

Further characteristics and advantages of the machine according to the invention will become better apparent from the description of two preferred but not exclusive embodiments thereof, illustrated by way of non-limiting example in the accompanying drawings, wherein.

DESCRIPTION OF THE PREFERRED EMBODIMENTS

Figure 1:
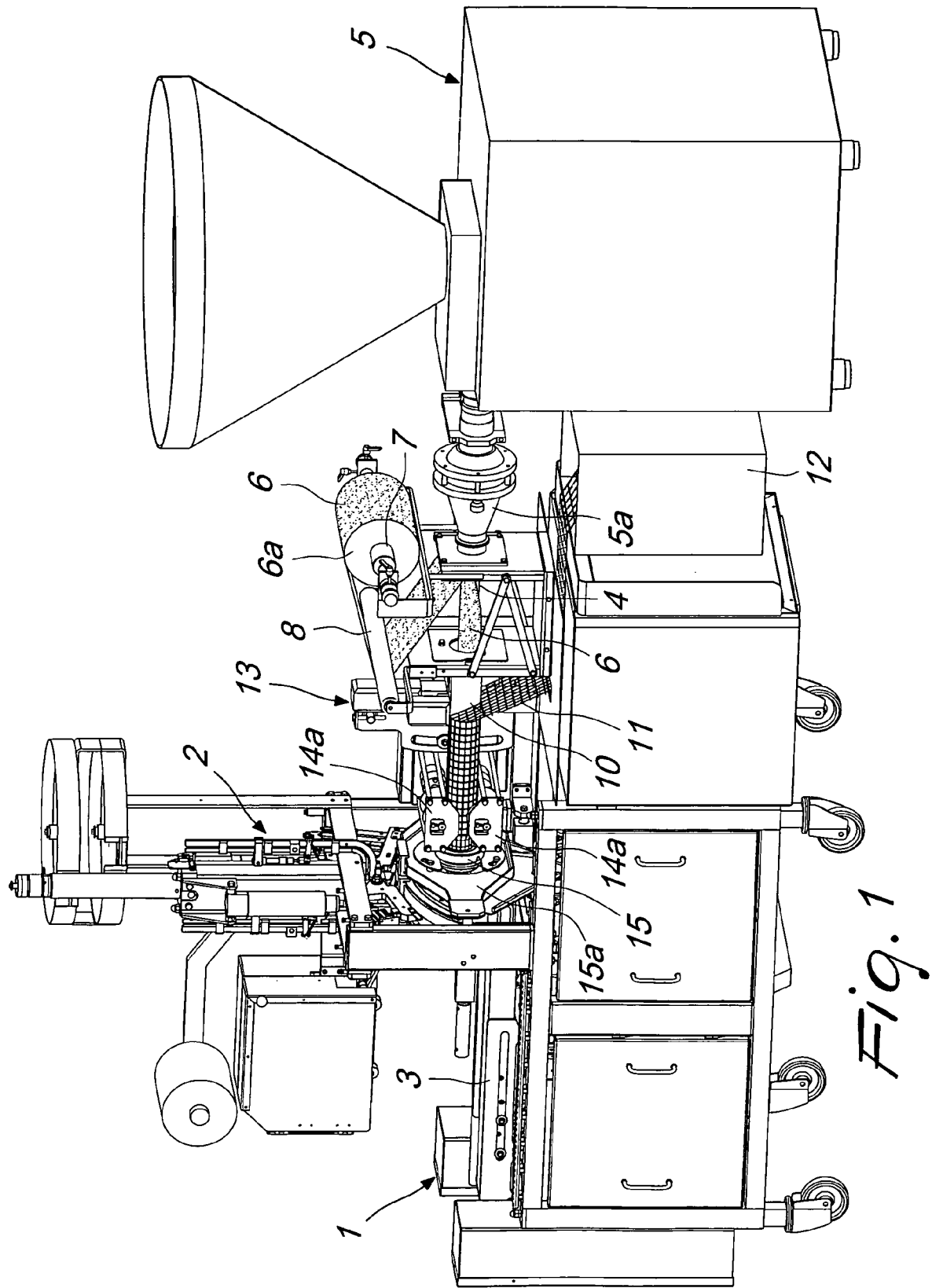
FIG. 1 is a perspective view of the machine according to the invention.
Figure 2:
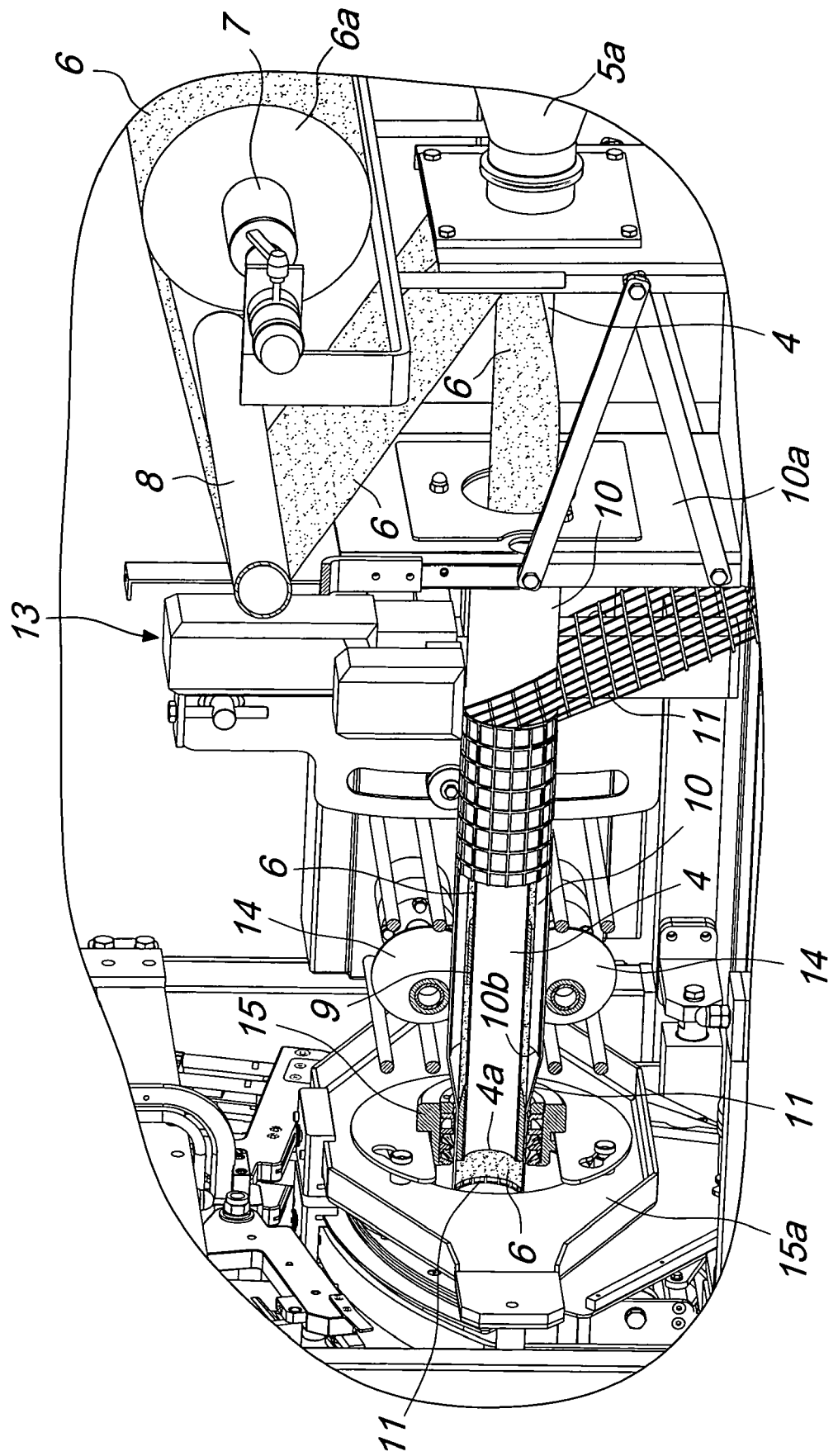
FIG. 2 is a partially sectional view of a detail of FIG. 1.

With reference to the FIGS. 1 and 2, the reference numeral 1 generally designates the preparation machine according to the invention, provided in a known manner with a clipping head 2, which closes each piece of cured meat at its leading and trailing ends before it arrives on the conveyor belt in output, which is comprised within a supporting structure 3.

The machine 1 comprises a first tube 4, which is designed to convey the product and extends from a coupling 5a for connection to a stuffing machine 5 to an end 4a arranged proximate to the clipping head 2.

The tube 4 is designed to be wrapped by a sheet of cellulose 6 which is designed to contain the cured meats, its surface being highlighted by stippling; the sheet is taken continuously from a reel 6a supported by a shaft 7, turns around a roller 8 and comes into contact with suitable guiding means so as to rest on the tube 4, assuming a tubular shape with superimposed edges in contact with sleeves 9 provided on the outer surface of the tube 4.

The machine 1 comprises a second tube 10, which is coaxial to tube 4 and extends from a plate 10a to an end 10b; the tube 10 is designed to be wrapped by a wrapper constituted by a net 11, which is drawn continuously from a magazine 12 and is stapled in contact with the tube 10 by means of a stapler 13, so as to assume a tubular shape, in such a manner as to wrap around the tube 10.

It should be noted that the net 11 is of the type known as "gauged", which is inextensible, and therefore is such as to ensure uniformity of the diameter of the cured meats packaged by the machine; obviously instead of the gauged net that has been and will be mentioned, the wrapper designed to be superimposed on the cellulose sheet 6 can be constituted by a sheath.

Moreover, the reference numeral 14 designates two rollers which are connected to means 14a, in the form of supports, for example, which draw the net 11 until it is superimposed on the cellulose sheet 6 at a braking device 15 which is connected to a support 15a upstream of the clipping head 2.

It clearly appears that the described machine ensures a continuity of operation which fully excludes the presence of downtimes; moreover, the choice of a product containment material such as cellulose, which allows the escape of water from the product while preventing penetration by air, allows to provide quick seasoning cycles of the products so as to affect uniformly the entire mass and without forming a surface crust.

It is further possible to peel the resulting cured meats in a particularly convenient manner.

Figure 3:
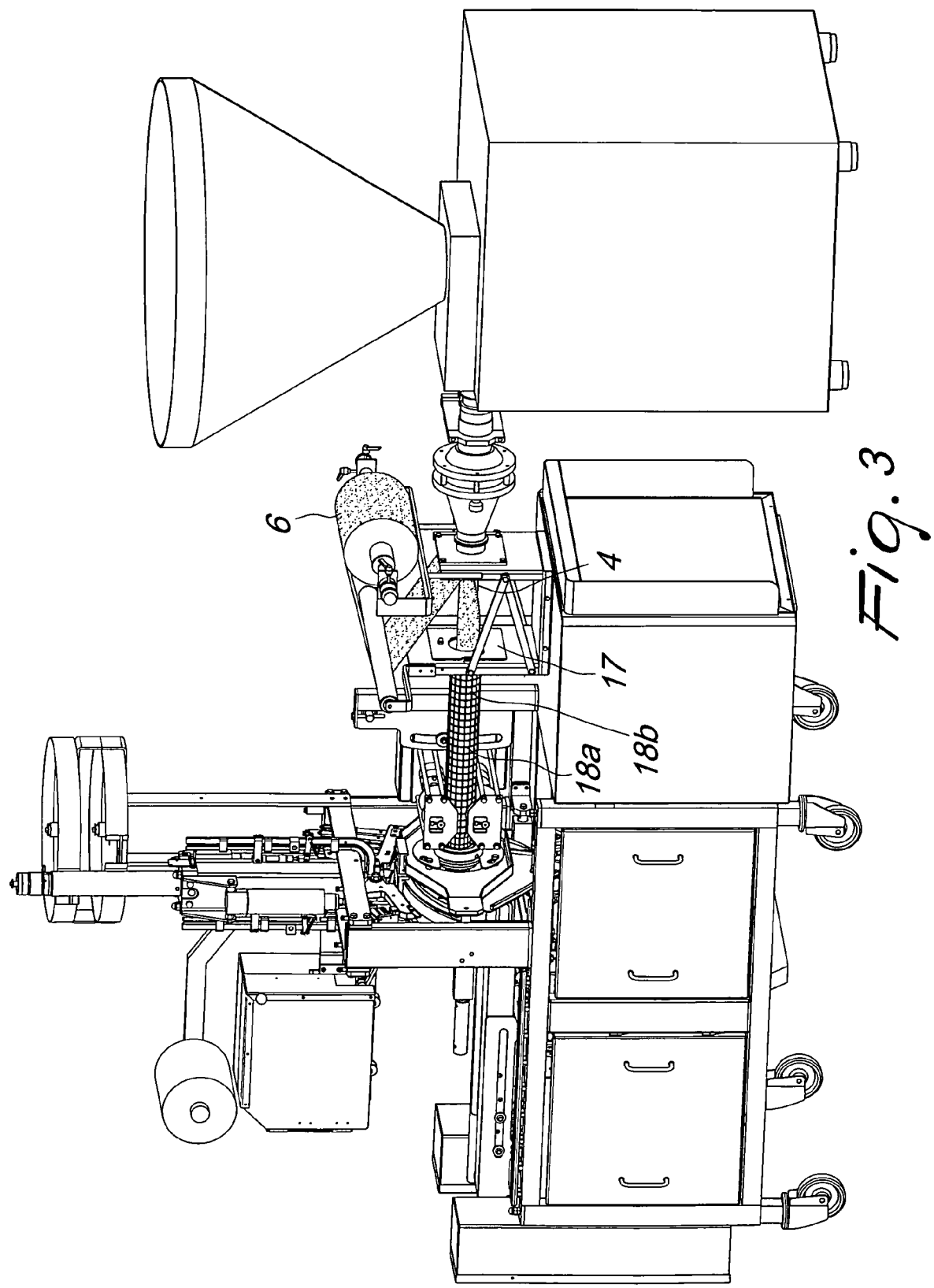
FIG. 3 is a perspective view of the machine according to the invention, in another embodiment.
Figure 4:
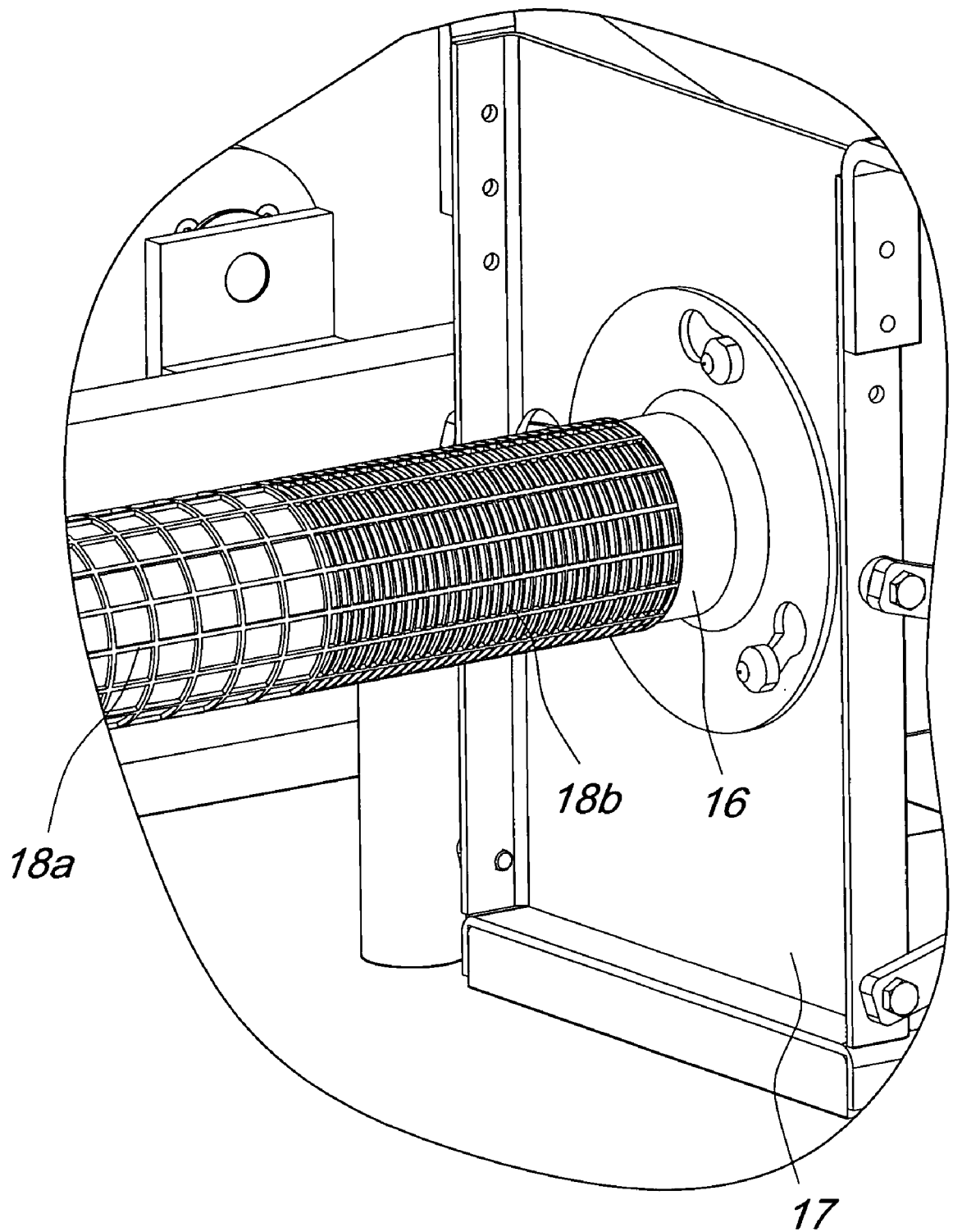
FIG. 4 shows a detail of the embodiment of FIG. 3, taken from a different angle.

FIGS. 3 and 4 are views of another embodiment of the machine according to the invention which differs from the embodiment described above only as regards the net that is designed to be superimposed on the cellulose sheet 6 at the braking device.

In this case, the net has a tubular shape and is loaded in a specific quantity, gathered or curled on a tube 16 which is associated with a support 17 so as to be coaxial to the outside of the tube 4 on which the cellulose sheet 6 is wrapped; FIGS. 3 and 4 show a portion of net 18a which is already spread in contact with the tube 16, while the reference numeral 18b designates the portion of net that is still gathered or curled.

Of course, the tube 16 is associated detachably with the support 17 to be removed easily when the amount of net loaded thereon is depleted and be replaced immediately with a loaded tube.

The described invention is susceptible of numerous modifications and variations, all of which are within the scope of the appended claims; thus, for example, the stapler 13 can be replaced with a different longitudinal joining machine which is particularly suitable for particular cases of wrapper.

The disclosures in Italian Patent Application no. MN2007A000031, from which this application claims priority, are incorporated herein by reference.

What is claimed is:

1. A machine for preparing encased cured meats, comprising: a first tube for conveying a cured meat product to a clipping head, said first tube being adapted to be wrapped by a cellulose sheet designed to contain the cured meat product, the cellulose sheet being drawn continuously from a reel; a second tube, which is arranged coaxially and externally to the first tube and is designed to be wrapped by a gauged wrapper, said second tube being provided with drawing means for drawing the wrapper, so that it is superimposed on said cellulose sheet, at a braking device arranged upstream of said clipping head; and a machine for the longitudinal joining of the gauged wrapper in contact with the second tube, which is drawn continuously from a magazine.

2. The machine according to claim 1, further comprising a machine for stapling the gauged wrapper in contact with the second tube, which is drawn continuously from a magazine.

3. The machine according to claim 1, wherein the second tube is designed to receive a specific quantity of gauged tubular wrapper gathered on the outer surface and is associated detachably with an end support so that it can be removed when said quantity of gauged wrapper loaded thereon is depleted.

* * * * *